UNITED STATES PATENT OFFICE

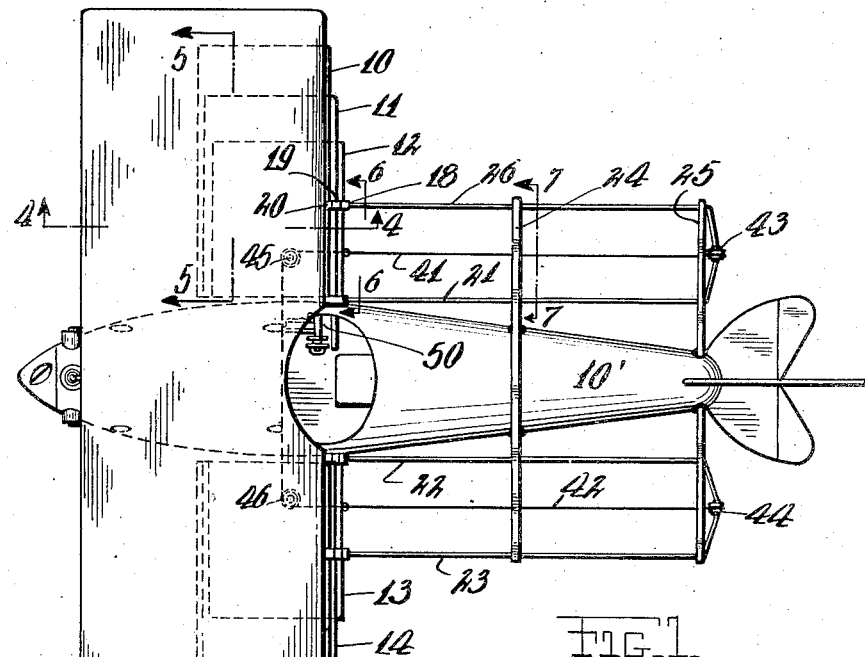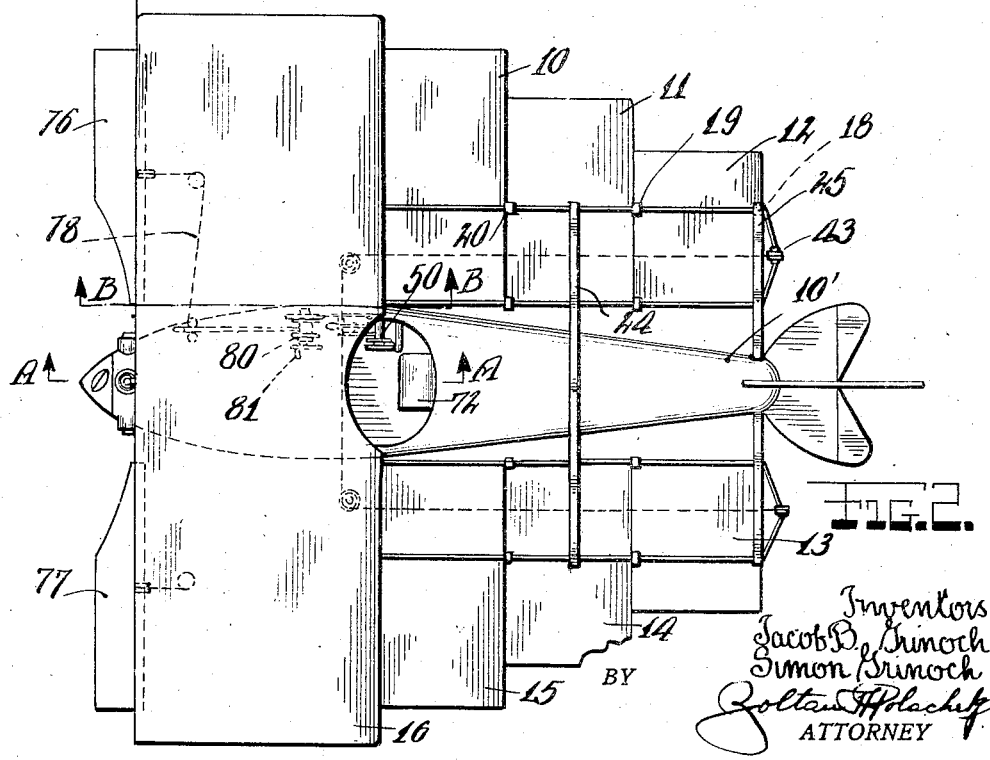

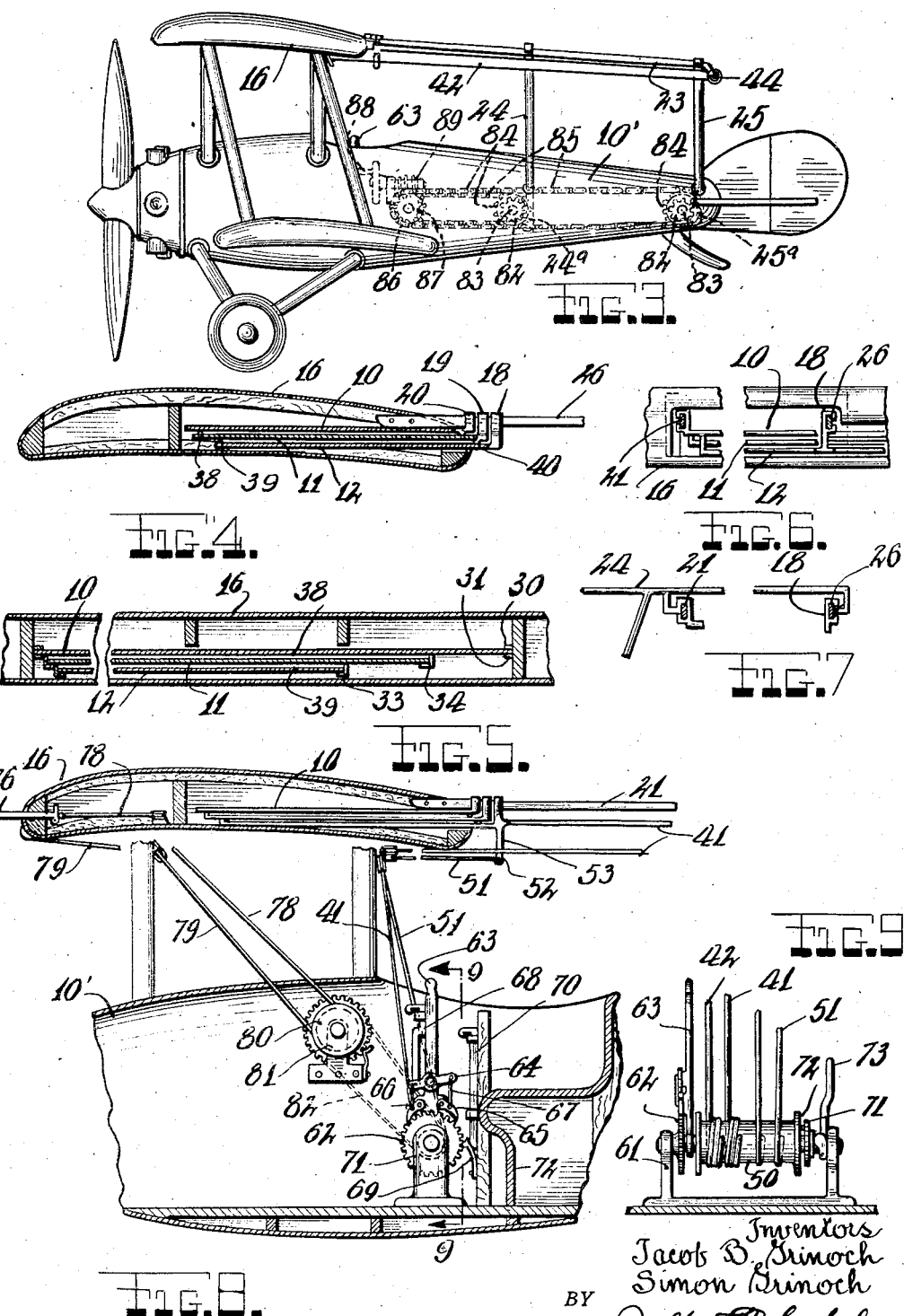

JACOB B. GRINOCH AND SIMON GRINOCH, OF NEW YORK, N. Y.

AEROPLANE

Application filed November 7, 1927. Serial No. 231,449.

This invention relates to improvements in aeroplanes, and has for its object to provide means for extending and contracting the wing area for the purpose of obtaining greater resistance to the forces of gravitation.

When at slow speed, or in the event of the engine stalling, or in air pockets where there is little sustaining power available in the atmosphere; the extension of the wings by means of the mechanism and construction shown herewith, will support the plane efficiently and permit of a slowly graduated descent, or the hovering over a certain locality by proper manipulation at the will of the operator.

Novel means are provided in this invention for the compact holding of the extension wings when not in use, and for their movement into operative positions as desired, and for securing them in these positions.

A full description of the device and its construction will be found set forth in the following specification and illustrated in the accompanying drawings:

Fig. 1 shows a top plan view of an aeroplane with rear extension wings in closed position.

Fig. 2 shows a similar view embodying a modification, in which forward extension wings are in co-relative arrangement with those seen in Fig. 1.

Fig. 3 shows a side view of the plane and illustrates the guide rails of the extension wings.

Fig. 4 shows on an enlarged scale, a section on the line 4—4 of Fig. 1.

Fig. 5 shows an enlarged section on the line 5—5 of Fig. 1.

Fig. 6 shows a fragmentary view on the line 6—6 of Fig. 1.

Fig. 7 shows a fragmentary view of the guide rails and a frame bracket as seen on the line 7—7 of Fig. 1.

Fig. 8 shows an enlarged fragmentary sectional view in which the lower part, shown broken off from the upper, is taken on the line A—A of Fig. 2, and the upper portion on the line B—B of Fig. 2.

Fig. 9 shows a view of the winding mechanism as seen on the line 9—9 of Fig. 8.

Referring now to Figure 1 of the drawings, extensible wings 10, 11, 12, 13, 14, and 15 are shown telescoped in their closed position within the upper wing 16 of the plane. These extensible wings are sustained within the upper wing by slide members which will be described later, and by slide lugs as those seen at 18, 19, and 20 which are secured to the rear margins of the said wings and are slidably supported on the rails as seen at 26, 21, 22 and 23. These rails are secured at their forward ends to the wing structure as will be described later, and are further supported by the bracket frames as seen at 24 and 25, which are adjustably secured to the body 10' of the plane. The extensible wings, fully opened, are shown in Fig. 2. The lower ends of the brackets 24 and 25 are provided with rock teeth $24^a$, $25^a$, meshing with pinions 82 on shafts 83 having gears 84 engaged by chains 85 extended over other gears 86 and 87 and are driven by a worm connection 89, said worm is provided with turning handles 88. The handles 88 may be individually operated to rotate gears 86 and 87 so as to adjust the tracks 21, 22, 23 and 26 to different angles to the body 10' of the plane, so as to obtain the most desirable angles, preferably by testing the plane with the tracks at various angles.

Reference will now be had to Fig. 4 of the drawings. It will here be seen that the rail 26 is secured to the frame of the wing 16 and that the slide lugs 18, 19 and 20 are movably hung on the said rail. It may be said here; that space does not permit of detailed showing of the actual structure of the extensible wings 10, 11 and 12, but it is obvious that they may comprise marginal frames and suitable coverings thereon, of the fabric known as aeroplane cloth, or any other proper form of material. The upper of the said wings slides within the ledges 30 and 31, and the lower wings are slidably supported by the members as seen in Fig. 5 at 33 and 34, these being secured to the wings each above that which is supported. Referring again to Fig. 4, it will be seen that end lugs as 38 and 39 are attached to the wings 11 and 12 and that when the wing 12 is drawn backward, the lug 39 engages the rear lug 40 of the wing 11, and the lug 38 engages the rear lug of the wing 10. Referring now to Fig. 1, cables 41 and 42 are secured to the wings 12 and 13 and run back over the pulleys 43 and 44 and then forward around the pulleys 45 and 46 and on to points of attachment on the drum 50. The winding of the said drum in a forward direction acts to draw the extensible wings into their open position. The return, or closing operation is performed by means of the retracting cables as that seen in Fig. 8 at 51. The attachment is such as to wind oppositely on the drum, and the wing attachment is as shown at 52 to the bracket 53.

The winding mechanism is illustrated in Figs. 8 and 9 and is as follows; the drum 50 is supported within the frame 61 and has on one end, a ratchet wheel 62. A lever 63 is rotatably supported on the drum shaft and has on its side, a rocker 64. Loosely supported from this rocker are the pawls 65 and 66, the connection being by means of flexible cables as seen at 67. The rocker is controlled by the lift bar 68. It may be seen that a forward motion may be imparted to the drum by swinging the lever when the pawl 66 is engaged, and a reverse motion may be applied when the pawl 65 is in operative position. The ratchet wheel is prevented from back lash by the spring dog 69 which is free when the lock bar 70 is in raised position. A loose sprocket 71 is provided with a lug 72 which engages the flange of the drum when the cam lever 73 is thrown over.

It will now be seen that the extensible wings may be opened and closed by means of the lever 63 which is within easy reach from the seat 72, and may be locked in any desired position by the spring dog 69.

A modification of the invention seen in Fig. 2, comprises forward extensible wings 76 and 77 which may be controlled by cables as seen in Fig. 8 at 78 and 79 from the drum 80. This drum may be operated by the hand crank 81, or may be driven from the main drum 50 by the chain 82, the sprocket 71 being thrown in by the cam lever 73.

It is to be understood that our extensible wings may be opened and closed by a mechanical device, operated automatically by a suitable motor thru gears and a worm arrangement which engages a suitable clutch on the extensible wings. The clutch may be opened and closed at will to extend the wings. Another worm having oppositely threaded teeth, may be also rotated by the motor at will to withdraw the extended wings into the wing 16.

While we have above described the preferred form, construction and arrangements of the several elements employed, it will be understood that the device is, nevertheless, susceptible of considerable modification therein, and we therefore reserve the privilege of resorting to all such changes as may be fairly embodied within the spirit and scope of the invention as claimed.

Having thus described our invention, what we claim as new and desire to secure by Letters Patent, is as follows:

1. In an aeroplane with telescopic wings arranged for moving into an extended position, rails for supporting the telescopic wings in extended positions, bracket frames supporting the rails, rack teeth formed on the lower ends of the bracket frames, pinions meshing with the said rack teeth and arranged for rotation manually controlled for moving the bracket frames and changing the positions of the said rails so as to change the position of the said telescopic wings when in extended positions.

2. In an aeroplane with telescopic wings arranged for moving into an extended position, rails for supporting the telescopic wings in extended positions, bracket frames supporting the rails, rack teeth formed on the lower ends of the bracket frames, pinions meshing with the said rack teeth and arranged for rotation manually controlled for moving the bracket frames and changing the positions of the said rails so as to change the position of the said telescopic wings when in extended positions, and a worm and worm pinion connected with the said pinions for operation in the rotation thereof.

3. In an aeroplane with telescopic wings arranged for moving into an extended position, rails for supporting the telescopic wings in extended positions, bracket frames supporting the rails, rack teeth formed on the lower ends of the bracket frames, pinions meshing with the said rack teeth and arranged for rotation manually controlled for moving the bracket frames and changing the positions of the said rails so as to change the position of the said telescopic wings when in extended positions, the said pinions being connected for simultaneous operation by being fixed on shafts provided with gears connected by a chain.

In testimony whereof we have affixed our signatures.

JACOB B. GRINOCH.
SIMON GRINOCH.